United States Patent
Koslow

(10) Patent No.: US 6,610,415 B2
(45) Date of Patent: Aug. 26, 2003

(54) MAGNETIC OR MAGNETIZABLE COMPOSITE PRODUCT AND A METHOD FOR MAKING AND USING SAME

(75) Inventor: Evan E. Koslow, Weston, CT (US)

(73) Assignee: Koslow Technologies Corporation, Orange, CT (US)

(*) Notice: Subject to any disclaimer, the term of this patent is extended or adjusted under 35 U.S.C. 154(b) by 10 days.

(21) Appl. No.: 10/066,003

(22) Filed: Oct. 26, 2001

(65) Prior Publication Data

US 2003/0082396 A1 May 1, 2003

(51) Int. Cl.[7] .................. B32B 15/16; H01F 10/08; H01F 10/30
(52) U.S. Cl. .............. 428/553; 428/557; 428/559; 428/611; 428/692; 428/694 B; 148/105; 148/306
(58) Field of Search ............... 428/611, 692, 428/694 B, 900, 553, 557, 559; 148/105, 306

(56) References Cited

U.S. PATENT DOCUMENTS

| | | | | |
|---|---|---|---|---|
| 3,933,536 A | * | 1/1976 | Doser et al. ............ | 148/105 |
| 3,983,276 A | * | 9/1976 | Matsumoto ............. | 428/40.9 |
| 4,992,329 A | * | 2/1991 | Ishii et al. ............. | 428/328 |
| 5,295,342 A | * | 3/1994 | Roche et al. ........... | 52/764 |
| 5,384,999 A | * | 1/1995 | Roche et al. ........... | 52/764 |
| 5,682,670 A | * | 11/1997 | Bell et al. .............. | 29/609 |
| 5,792,513 A | * | 8/1998 | Koslow et al. .......... | 427/195 |
| 5,925,455 A | * | 7/1999 | Bruzzone et al. ........ | 428/328 |
| 6,120,916 A | * | 9/2000 | Delvinquier et al. ..... | 428/692 |

* cited by examiner

Primary Examiner—John J. Zimmerman
Assistant Examiner—Jason L Savage
(74) Attorney, Agent, or Firm—Shirley S. Ma

(57) ABSTRACT

Thin, flexible composite materials, which are magnetic or magnetizable and processes for producing and using the materials. The composite material contains a laminate formed from a mixture of magnetic or magnetizable particles, binder particles (and optionally active particles), applied to and fused and/or coalesced with a first substrate. The composite preferably contains an additional second substrate fused to and/or coalesced with, the laminate on the side of the laminate opposite that of the first substrate.

11 Claims, 4 Drawing Sheets

MAGNETIC OR MAGNETIZABLE COMPOSITE PRODUCT AND A METHOD FOR MAKING AND USING SAME

BACKGROUND OF THE INVENTION

I. Field of the Invention

This invention generally relates to a composite material having a magnetic or magnetizable function. More particularly, this invention relates to novel composite materials that are magnetizable, magnetic, has magnetic properties, or any combination thereof.

II. Description of the Art

There is a need for providing a magnetic surface to shelves, drawers, walls, partitions and cabinets to support magnets that hold displays, papers, diagrams, pins, stickers or other objects. In addition, it is often desirable to have thin, flexible, ferro-magnetic or magnetizable (hereinafter collectively referred to as "magnetic") sheets or plies that can be employed in a variety of situations.

However, such magnetic sheets are typically non-porous and/or substantially metallic. Thus, there exists a need for improved magnetic sheets or plies that can be porous and substantially non-metallic, and methods for manufacturing such magnetic sheets or plies.

SUMMARY OF THE INVENTION

The present invention provides for a magnetic or magnetizable composite material having a first substrate and a laminate or bonded mixture of magnetizable or magnetic particles and binder particles. The binder particles are preferably on average smaller than the magnetizable or magnetic particles, and at least some of the binder particles coalesce at least some of the magnetizable or magnetic particles to each other, and to the first substrate.

In addition, the above composite may further have a plurality of additional active particles, in addition to the magnetizable or magnetic particles, that perform a suitable function. The active particles may be any suitable particle that performs a suitable function including, but not limited to, adsorbent particles, absorbent particles, particles that release liquid or gas held therein, biologically active particles, and the like.

Also, the present invention provides for the above composite having a second substrate located such that the laminate is between the first substrate and the second substrate, wherein at least some of the magnetizable or magnetic particles are coalesced by the binder particles to each other, to the first substrate, and/or to the second substrate.

The present invention further provides for a method for producing the above composite having the steps of applying a mixture of magnetizable or magnetic particles and binder particles to a substrate, applying heat to the mixture on the substrate, and applying pressure to the mixture and the substrate such that the binder particles coalesce the magnetizable particles to themselves, and to the substrate.

Accordingly, there is provided for a thin, flexible composite material, which is magnetizable, and can be magnetic or made magnetic. The composite material of the present invention may be used by placing it upon an outer or inner functional surface such as a shelf, a drawer, a cabinet, a wall or wall panel, a display board, or a room dividing partition.

DETAILED DESCRIPTION OF THE INVENTION

Figure 1:
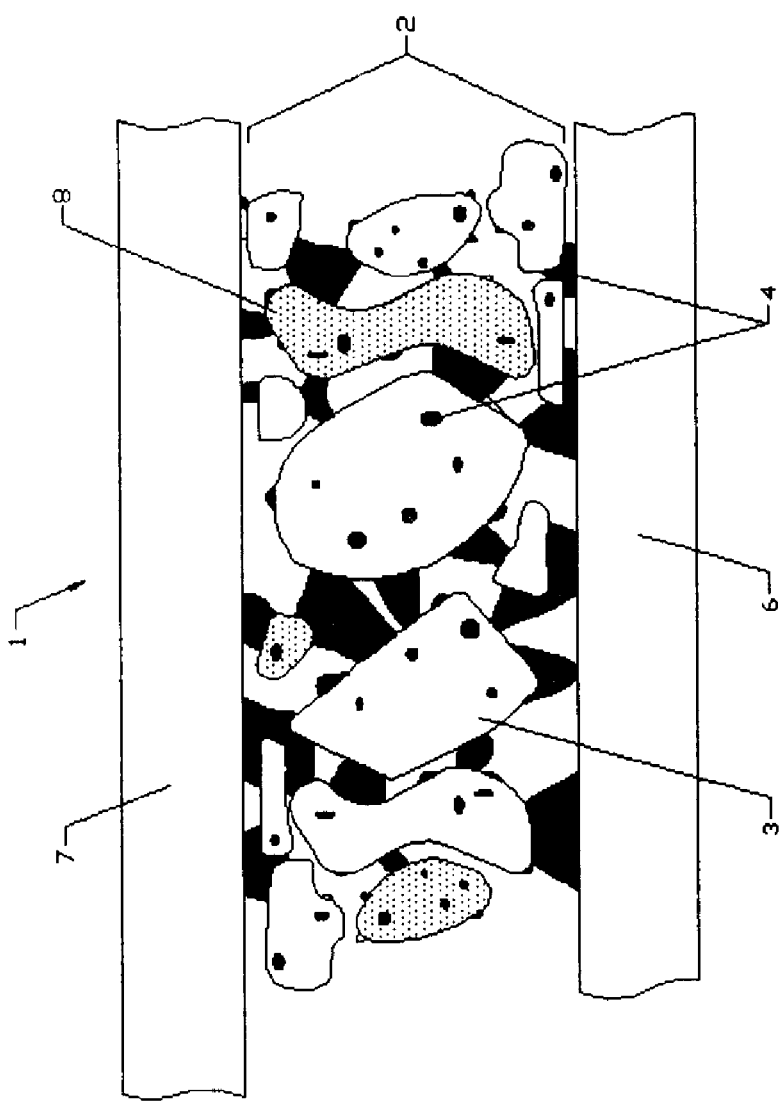
FIG. 1 is a cross-sectional view of a preferred embodiment of the magnetizable or magnetic composite of the present invention.

Referring to the drawings, and in particular FIG. 1, there is provided a magnetizable or magnetic composite generally indicated as 1. The composite 1 has a first substrate or backing layer 6 and optionally a second substrate sometimes referred to as a covering layer or top sheet 7. First substrate 6 and second substrate 7 may be formed of various materials depending upon the intended application and need not be formed of the same or similar material within one composite. By way of example only, substrates 6 and/or 7 may be permeable materials, such as non-woven fibrous webs, e.g., spun bonded, melt blown or carded materials composed of polyester or polyolefinic fibers. The substrates may also be formed from woven materials. Substrates 6 and/or 7 may optionally be formed wholly or in part from cellulosic materials including tissue or towel stock. In the alterative, substrates 6 and/or 7 may be either semi-permeable or impermeable to liquids, e.g., a polymeric film, metal foil, metal mesh or the like.

Coalesced with first substrate 6, and optionally with second substrate 7, is a magnetizable or magnetic laminate or bonded mixture indicated generally as laminate 2. Laminate 2 has magnetizable or magnetic particles (hereinafter magnetic particles) 3 and binder particles 4. The binder particles 4 coalesce at least some of the magnetic particles 3. An amount of binder particles 4 also coalesce at least some of the magnetic particles 3 to substrate 6, and optionally to substrate 7, or to both substrates 6 and 7.

Magnetic particles 3 may be formed from any suitable magnetic or magnetizable material. Preferably, magnetic particles 3 contain ferromagnetic material, magnetizable material, or a combination thereof. In other words, the magnetic particles 3 may have magnetic properties so that a magnetic or magnetizable structure or substance, external to that of composite 1, would be attracted to the material. In this regard, there are three possibilities. Composite 1 may be magnetic, the external structure or substrate may be magnetic, or both may be magnetic.

Thus, the magnetic particles 3 may also be magnetizable, that is may be of a material that can be made to be magnetic such as iron or steel. Examples include stainless steel of the 400 series such as 410 stainless steel. Further, while much more expensive, other material such as rare earth magnetic media can be used for very specialized applications, the cost of such materials is prohibitive for most applications, but the use of such materials should be considered as encompassed within the scope of the invention.

Magnetic particles 3 may have an average particle size from about 5 microns to about 5000 microns, preferably from about 100 microns to about 1000 microns.

Optionally, laminate 2 can contain other suitable active particles 8 in addition to magnetic particles 3. Suitable active particles 8 may be any particle that performs a suitable function including, but not limited to, adsorbent particles, absorbent particles, biologically active particles, and the like. Furthermore, active particles 8 may be used to release a suitable fluid or a suitable gas held therein. Such a fluid or gas includes but is not limited to a: lubricant, herbicide, pesticide, insecticide, fungicide, fragrance, humectant, desiccant, antimicrobial agent, malodor absorbing agent, biologically active agent, dye, indicator, and a combination thereof.

Suitable active particles 8 also include, but are not limited to: iodinated resin, activated carbon, activated alumina, non-magnetic metal powder, alumina-silicate, super absorbent polymer, metal oxide, zeolite, glass bead, ceramic, diatomaceous earth, macroporous polymer, aerogel, cellulosic material, antimicrobial agent, fragrance, fragrant material, glass micro fiber, titanate micro fiber, starch, foamed polymer absorbent, macroporous super absorbent polymer, macroreticulate super absorbent polymer, expanded vermiculite (perlite), carbon, anion exchange resin, cationic exchange resin, protein solid, organic acid, inorganic acid, mineral, salts of an organic acid, salts of an inorganic acid, acrylic based polymer, clay, metal oxihydrate, talcum, silicic acid, metal hydroxide, modified cellulose, cellulose, dye, indicator, liquid absorbing compound, malodor absorbing agent, molecular sieve, phosphate, biologically active agent, and a combination thereof. Biologically active agents can be biocides such as silver-impregnated zeolites or aluminas or organic or inorganic materials to control microbiological contamination.

The active particles 8 may also be coated with, impregnated with, or a combination thereof, a suitable active agent. Suitable active agents include, for example: fluid, lubricant, herbicide, insecticide, pesticide, biocide, fungicide, fragrance, humectant, desiccant, antimicrobial agent, malodor absorbing agent, biologically active agent, dye, indicator, and a combination thereof.

Active particles 8 have an average particle size from about 5 microns to about 5000 microns, preferably from about 100 microns to about 1000 microns.

Any suitable binder material may be employed in this invention. Materials suitable for forming binder particles 4 include thermoplastic binders and thermoset resin binders. As used herein, the term "thermoplastic binder" means any binder, typically a polymer, which is thermoplastic, i.e., capable of softening and flowing when heated and of hardening again when cooled. Preferred binder materials include, polyethylene, polypropylene, poly(ethylene vinyl acetate), and nylon.

Preferably, binder particles 4 are present in such an amount and at such a size that they do not substantively interfere with the functioning of magnetic particles 3, and optionally with active particles 8. Binder particles 4 preferably have an average size of about 5 microns to about 100 microns. In addition, binder particles 4 are generally significantly smaller in average size than magnetic particles 3, and optionally the average size of active particles 8. More preferably, binder particles 4 are about 4 to 25 times smaller, on average, than the average size of magnetic particles 3, optionally the average size of active particles 8.

Figure 2:
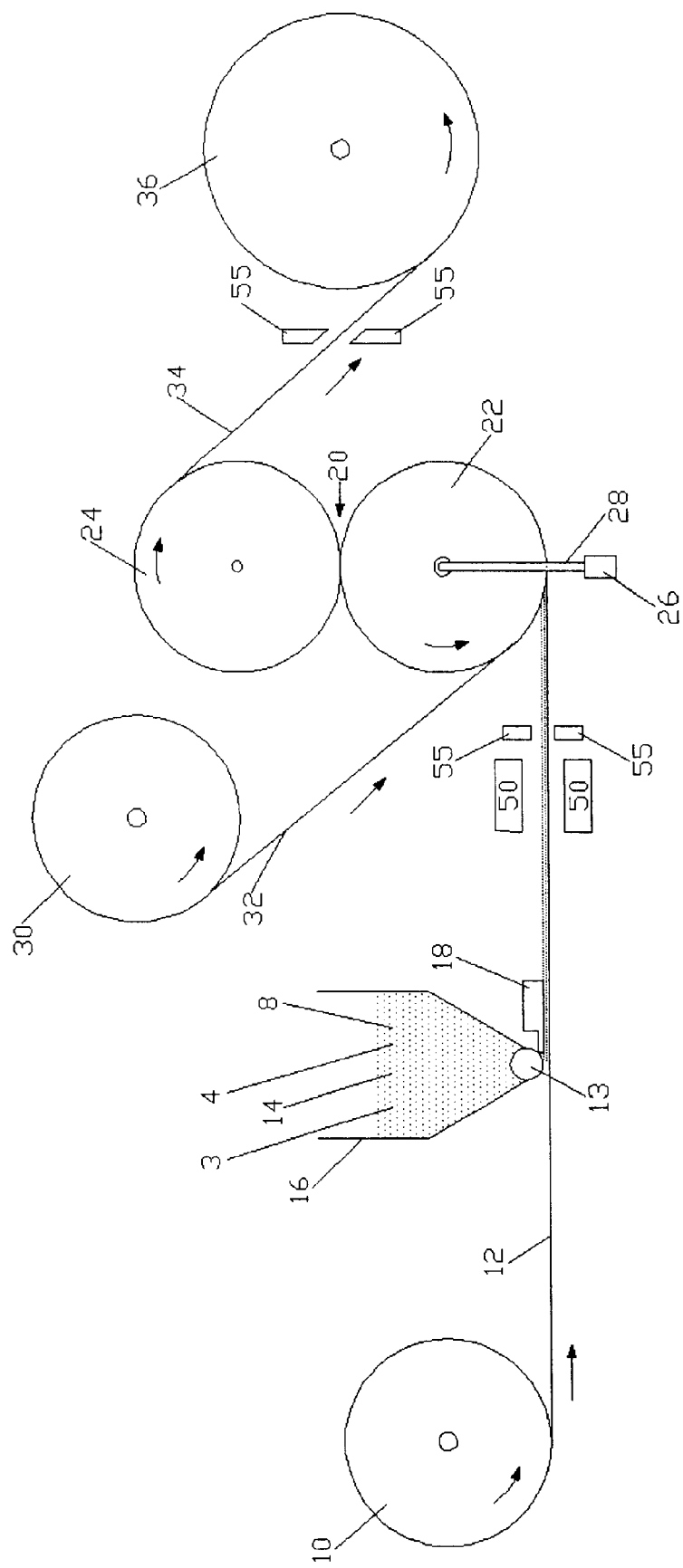
FIG. 2 is a schematic diagram illustrating an apparatus and process for making the magnetizable or magnetic composite of the present invention.

FIG. 2 illustrates an exemplary apparatus used to produce this invention. A supply roll 10 provides a first substrate 12. Downstream from supply roll 10 is a knurled roller 13 positioned to receive a mixture of magnetic particles 3, optionally active particles 8 and binder particles 4, generally indicated as mixture 14, from hopper 16. Mixture 14 is applied to the upper surface of substrate 12 as a continuous coating or, alternatively, as a coating in a specific design including, but not limited to, stripes. A brush 18 may be employed to aid in removing mixture 14 from knurled roller 13.

Thereafter, substrate 12 containing mixture 14 is passed through nip 20 between a heated idler roller 22 and a drive roller 24. Alternatively, before being passed through nip 20, substrate 12 containing mixture 14, may be preheated by a pre-heater 50 such as, for example, a convection or infrared oven, or other suitable heating source. A pneumatic cylinder 26 is connected via a rod 28 to the axle of idler roller 22 to maintain a desired pressure on substrate 12 containing mixture 14 within nip 20. In passing through pre-heater 50, and over the surface of heated roller 22, mixture 14 is heated to a temperature equal to or greater than the softening temperature of binder particles 4, but to a temperature below the softening temperature of magnetic particles 3, and optionally below the softening temperature of active particles 8. Within nip 20, softened binder particles 4 coalesce under pressure with magnetic particles 3, and optionally with active particles 8. A portion of binder particles 4 coalesce with first substrate 12.

When magnetizable particles 3 are used, the particles may be magnetized once applied to substrate 12 by passing the mixture through a suitable magnetizing means 55 and/or 55' which provide a magnetic field of sufficient intensity to magnetize particles 3. Magnetizing means 55 and/or 55' may be located prior to, or after nip 20, or may be located independent of the entire production apparatus. Alternatively, pre-magnetized particles may be used, the particles being caused to assume a more or less uniform orientation by magnetizing means 55 and/or 55'. In addition, if magnetizable particles 3 are used, it is possible to magnetize particles 3, at a later time, after processing of the type illustrated in FIG. 2. In this latter case, the presence of a magnetizing means 55 and/or 55' is not immediately required.

Furthermore, in a preferred embodiment of the present invention, as illustrated in FIG. 2, a second supply roll 30 of a second substrate 32, which may be of the same or may be of a different material from that of substrate 12, is also passed between nip 20 on the top of mixture 14. An amount of binder particles 4 coalesce with second substrate 32. Upon leaving nip 20, binder particles 4 cool and harden. The finished composite 34 then passes onto take-up roll 36.

By selection of substrate materials 12 and 32, binder materials 4, magnetic materials 3, optionally active particles 8, magnetic particles to binder weight ratios, absolute amounts of mixture 14 applied to substrate 12 per unit area, binder particle size, magnetic particle size, the ratio of binder particle size to magnetic particle size, as well as by adjusting the operating conditions, including, but without limitation, heating temperature, nip pressure and the linear speed of substrate 12, it is possible to vary composite depth, porosity, permeability, tensile strength, flexibility, pleatability, draping ability, magnetic strength, and other attributes of the magnetic composite of the present invention.

Figure 3:
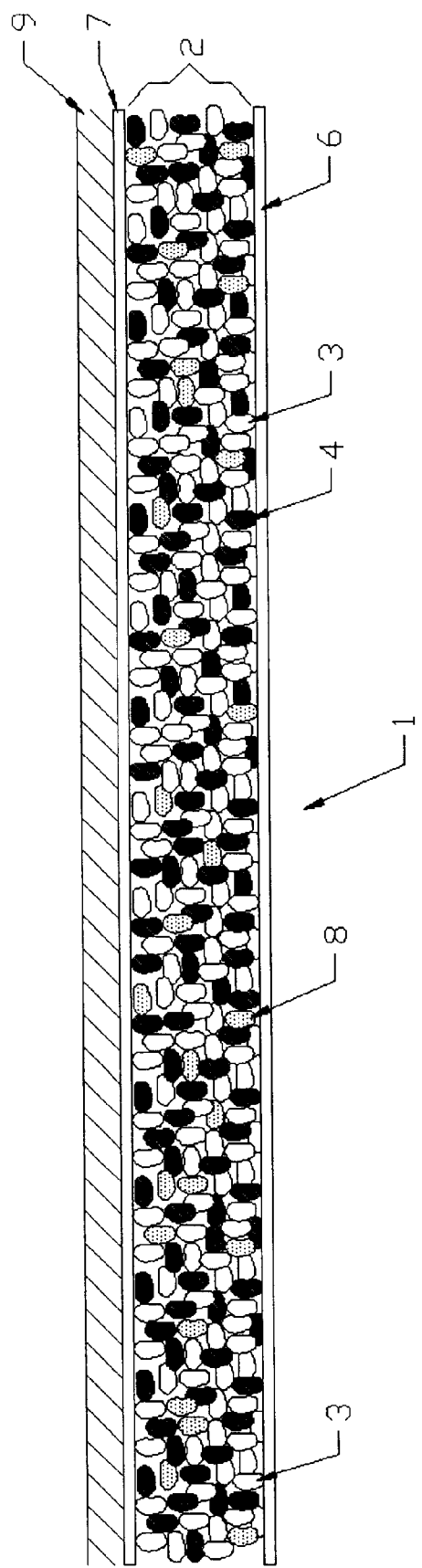
FIG. 3 is a cross-sectional view of a composite material of the present invention in contact with a surface.

As shown in FIG. 3, composite material 1 may be used on, under, on the side of, or aligned with any suitable surface 9, which is shown as being horizontal, but may also be a vertical surface, and may include, for example, a shelf, a drawer, a cabinet, and/or an inside or outside surface of a refrigerator. Preferably, composite material 1, due to the magnetic properties of laminate 2, is magnetically attached to a metal surface 9. Optionally, composite material 1 may be attached to, or combined with any suitable surface 9 by any suitable method. For example, composite material 1 may be fused, glued, tacked, stapled, chemically adhered, mechanically adhered, hooked, sewn, or otherwise joined with suitable surface 9. Alternatively, composite material 1 may be placed in direct proximity with suitable surface 9 without a bond or mechanical fastener. Common uses for composite material 1 include, for example, portable utility magnets, bulletin and message boards, calendars, signs, decorations, and games. Furthermore, magnetic composite 1 may be used on room dividers, partitions, and walls, such as those in office cubicles for easy posting of documents therein by magnetization, while retaining the ability to accept tacks and staples. In this regard reference is made to U.S. Pat. Nos. 5,295,342 and 5,384,999 which teach display boards, panels and wall sections of this general type.

In addition to metallic or magnetic particles, a magnetizable or magnetic expanded metal foil or flexible metal mesh or metal screen may be incorporated into the composite as first substrate 6, second substrate 7, or both substrates. This foil, screen, or mesh could be magnetized by any common method known in the art, either before, during, or after incorporation into the composite of the present invention.

Another feature of composite material 1 is that the thermoplastic and/or thermoset binder particles preferably impart a measure of flowability. For example, small holes made in composite 1 by a needle or a tack will generally seal themselves once the needle or tack is removed from composite 1. Thus, composite 1 is preferably not only thin and flexible, but also resilient and self-healing.

Figure 4:
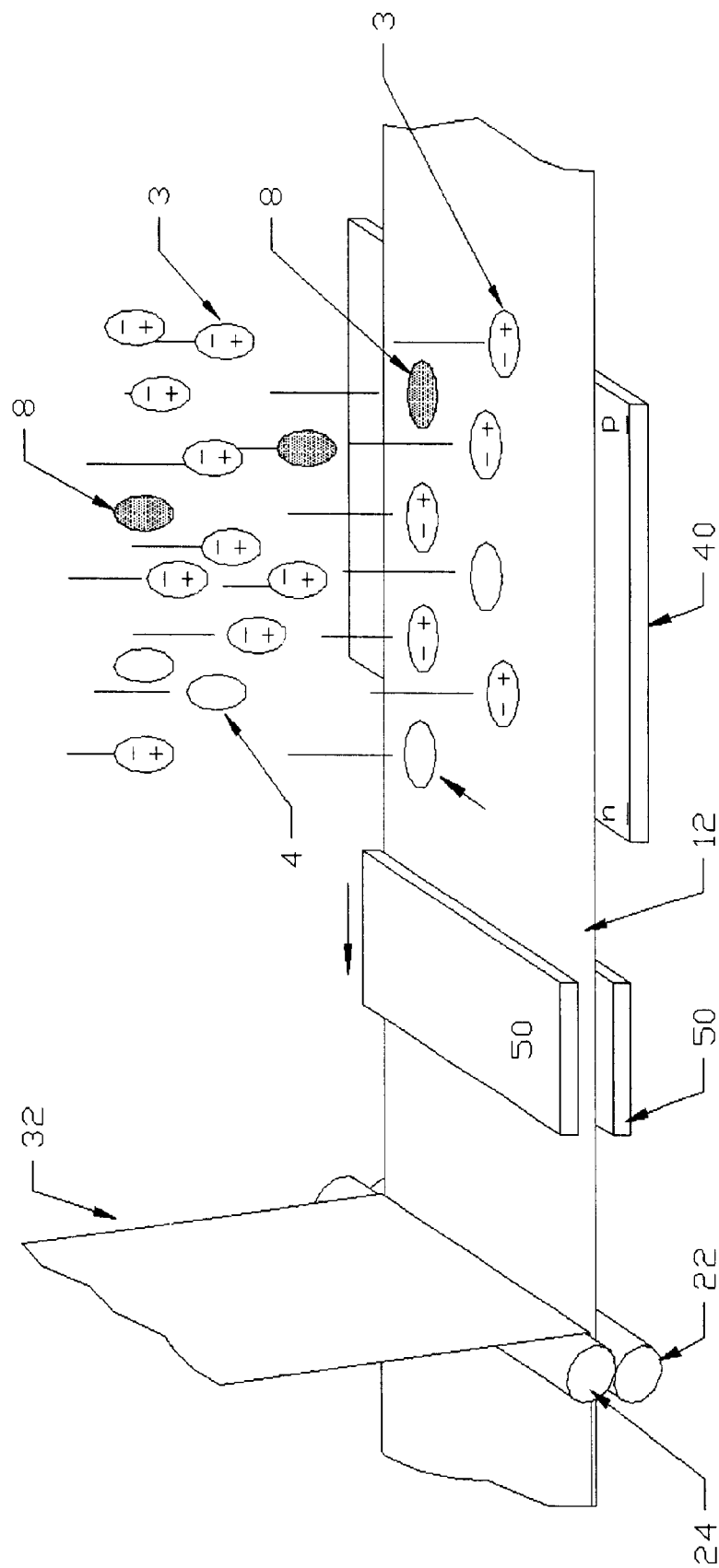
FIG. 4 is a schematic diagram illustrating an apparatus and process for making a highly oriented magnetic composite material according to an embodiment of the present invention.

Referring to FIG. 4, there is illustrated a schematic of a process for producing a highly oriented magnetic composite material. Using a process similar to that described in U.S. Pat. No. 5,792,513 herein incorporated by reference in its entirety, magnetic particles 3, and optionally active particles 8, are applied along with the binder particles 4 to substrate 12 to form a homogeneous layer on substrate 12. A magnetic orienting means 40, such as, by way of example and not by way of limitation, a magnet or a suitable electromagnet, positioned in proximity to substrate 12 causes the magnetic particles 3 to become oriented with the magnetic field lines created by magnetic orienting means 40. By orienting the individual particles, the magnetic particles 3 can be caused to form a strong magnetic surface. The coated substrate 12 then moves along in the process, optionally being preheated with pre-heater 50, and optionally acquiring upper substrate 32 prior to entering into nip 20 of heated rollers 22 and 24, whereby the mixture on the substrate is heated, subjected to pressure, and cooled to produce a flexible magnetic composite web having oriented magnetic particles 3 thereon.

Although the present invention has been described with respect to one or more particular embodiments, it will be understood that other embodiments of the present invention may be employed without departing from the spirit and scope of the present invention. Hence, the present invention is deemed limited only by the appended claims and the reasonable interpretation thereof.

What is claimed is:

1. A composite product comprising a first substrate having a powdered mixture comprising magnetizable or magnetic particles and binder particles, wherein at least some of said binder particles coalesce at least some of said magnetizable or magnetic particles to each other, and to said first substrate when said composite product is heated to a softening temperature of said binder particles, but below a melting temperature of said magnetizable or magnetic particles.

2. The composite of claim 1, wherein said binder particles are on average smaller than said magnetizable or magnetic particles.

3. The composite of claim 2, wherein said magnetizable particles have an average particle size from about 5 microns to about 5000 microns.

4. The composite of claim 3, wherein said binder particles have an average particle size of from about 5 microns to about 50 microns.

5. The composite of claim 1, wherein at least some of said magnetizable or magnetic particles are formed of a material selected from the group consisting of iron, steel, magnetic stainless steel and 400 series stainless steel.

6. The composite of claim 1, wherein said magnetic particles are ferromagnetic.

7. The composite of claim 1, further comprising a second substrate located such that said powdered mixture is between said first substrate and said second substrate, wherein at least some of said binder particles coalesce at least some of said magnetizable or magnetic particles to said second substrate.

8. The composite of claim 7, wherein said first substrate, said second substrate, or a combination thereof is a metal foil, metal screen, metal mesh, or a combination thereof.

9. The composite of claim 1, wherein said mixture further comprises a plurality of active particles.

10. The composite of claim 9, wherein said active particles are selected from the group consisting of: iodinated resin, activated carbon, activated alumina, non-magnetizable metal powders, alumina-silicates, super absorbent polymers, metal oxides, zeolites, glass beads, ceramics, diatomaceous earth, macroporous polymers, aerogels, cellulosic materials, anti microbial agents, fragrances, fragrant materials, glass micro fibers, titanate micro fibers, starch, foamed polymer absorbents, macroporous super absorbent polymers, macroreticulate super absorbent polymers, expanded vermiculite (perlite), carbon, anion exchange resins, cationic exchange resins, protein solids, organic acids, inorganic acids, minerals, salts of organic acids, salts of inorganic acids, acrylic based polymers, clay minerals, metal oxihydrates, talcum, silicic acid, metal hydroxides, modified cellulose, cellulose, synthetic polymers, dyes, indicators, liquid absorbing compounds, malodor absorbing agents, molecular sieves, phosphates, biologically active agents, and a combination thereof.

11. The composite of claim 1, wherein said binder particles are formed from at least one component selected from the group consisting of: thermoplastic materials, thermoset materials, and a combination thereof.

\* \* \* \* \*